United States Patent

[11] 3,631,746

| [72] | Inventor | Walter Rarog |
| | | 8045 Artesian, Detroit, Mich. 48228 |
| [21] | Appl. No. | 20,363 |
| [22] | Filed | Mar. 17, 1970 |
| [45] | Patented | Jan. 4, 1972 |

[54] TUBELESS TIRE REPAIR TOOL
3 Claims, 5 Drawing Figs.

[52] U.S. Cl. .................................................. 81/15.7
[51] Int. Cl. .................................................. B60c 25/16
[50] Field of Search .......................................... 81/15.7, 15.5, 15.2; 152/370

[56] References Cited
UNITED STATES PATENTS
928,069  7/1909  Reich .......................... 81/15.7

| 1,606,602 | 11/1926 | Stauffer ........................ | 81/15.7 X |
| 2,871,742 | 2/1959 | Tillman ........................ | 81/15.7 |
| 3,272,253 | 9/1966 | Brose .......................... | 152/370 |

FOREIGN PATENTS
821,183  9/1959  Great Britain ................ 152/370

Primary Examiner—Theron E. Condon
Assistant Examiner—Roscoe V. Parker, Jr.

ABSTRACT: A device for repairing tubeless tires. This device consists of a flattened and elongated steel tube for the purpose of keeping the wire within, rigid and keeping it from bending or breaking while repairing the tubeless tire.

The looped end of the wire serves as a probe for the tire puncture and also allows the plug which is prelubricated to be drawn into the puncture.

PATENTED JAN 4 1972

3,631,746

INVENTOR.
WALTER RAROG

TUBELESS TIRE REPAIR TOOL

This invention relates to tire-repairing implements, and more particularly to a tire repair tool.

It is therefore the main purpose of this invention to provide a tubeless tire repair tool which will have a flat steel sleeve portion in which is slideable a wire having a loop, the flattened sleeve serving to prevent bending and breading of the wire and serving to impart rigidity thereto.

Another object of this invention is to provide a repair tool of which the eye portion of the wire serves as a probe means for the puncture opening and also provides a means of carrying a prelubricated plug into the puncture in order to seal the tire.

A further object of this invention is to provide a tool of the type described which will pull the plug partially through the outside of the tire where it may then be cut off in order that the plug will be flush with the exterior of the tire, the sleeve of the tool having handle grip means for the operation thereof.

Other objects of the present invention are to provide a tubeless tire repair tool which is simple in design, inexpensive to manufacture, rugged in construction, easy to use and efficient in operation.

These and other objects will be readily evident upon a study of the following specification and the accompanying drawing wherein.

Figure 1:
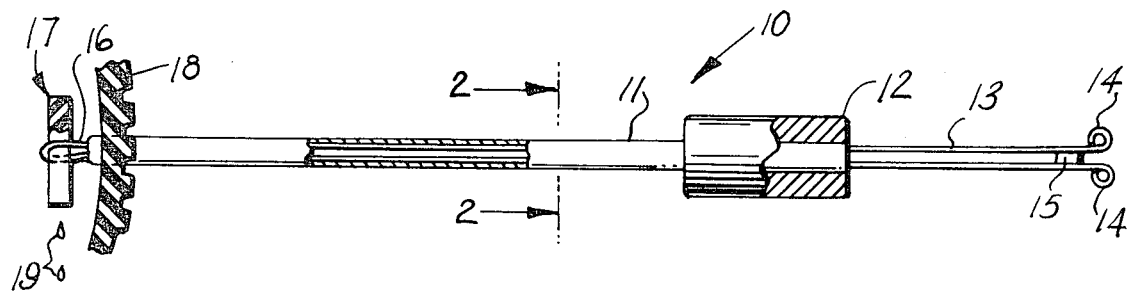
FIG. 1 is a horizontal view of the present invention shown in elevation and partly broken away with the plug shown inserted on the interior of the tire which is shown in fragmentation.
Figure 3:
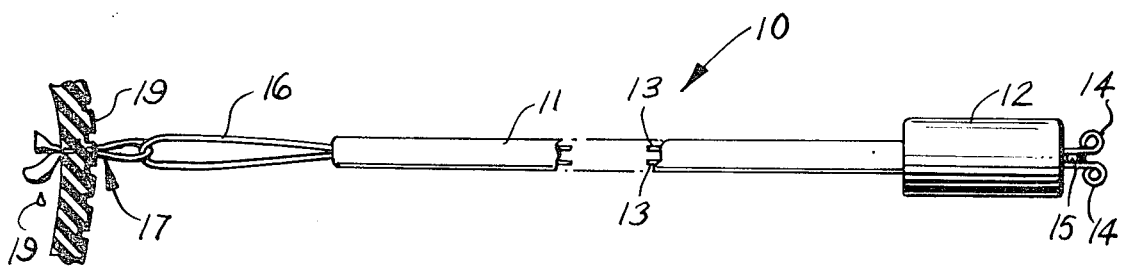
FIG. 3 is similar to FIG. 1, but showing the plug pulled through and positioned for severing the outside portion therefrom.

According to this invention, a tire repair tool 10 is shown to include an elongated and flattened steel sleeve 11 which is fixedly secured within a handle 12.

Tube 11 slideably carries a wire 13 having an eye 14 bent at each end, the two portions of wire 13 including solder 15 which secures the two ends having eye 14 together.

From the chamfered end of sleeve 11 extends the eye 16 of wire 13 which is used as a probe for the puncture as well as serving as a carrying means for a rubber plug 17 which is used to repair the tire 18.

Plug 17 is placed within the eye 16 of wire 13 of tool 10 and sleeve 11 is carried forward by means of the handle 12, the sleeve 11 serving as a preventive means for keeping the eye 16 from bending or breaking when probing and inserting plug 17 into tire 18.

The rubber plug 17 is prelubricated with rubber cement 19 prior to repairing tire 18 and by pulling upon the handle 12 of tool 10, plug 17 is placed into the puncture opening and the looped portion extending on the exterior of tire 19 is then severed, thus completing the tire repair.

Figure 5:
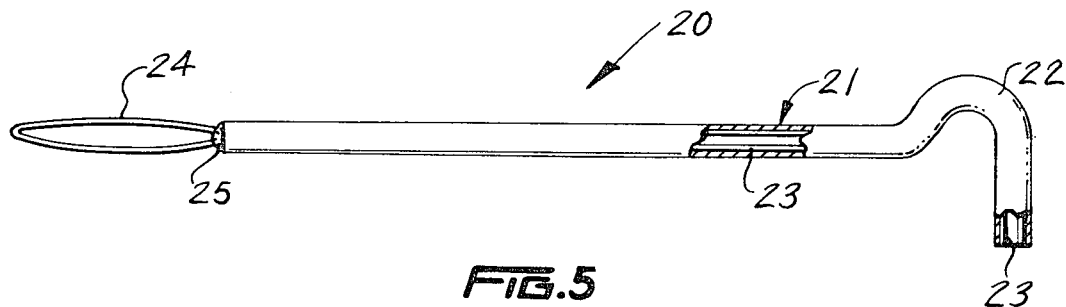
FIG. 5 is a horizontal elevation showing a modified form of the invention.
Figure 4:
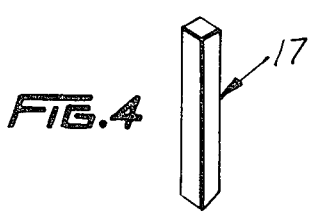
FIG. 4 is an enlarged perspective view of the plug prior to its placement into a tire.
Figure 2:
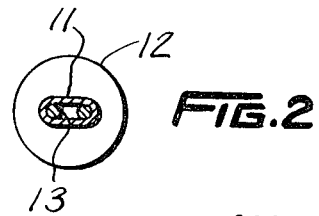
FIG. 2 is an enlarged transverse view taken along the line 2—2 is an enlarged transverse view taken along the line 2—2 of FIG. 1.

Looking now at FIG. 5 of the drawing, one will see a modified form of tubeless tire repair tool 20 having a sleeve 21 similar to that of described of the main embodiment of the present invention, however, sleeve 21 is bent to form a handle grip 22, the entire length of sleeve 21 carrying a wire 23 of which the ends are flushed with the bottom of handle grip 22 while an eye portion 24 extends from the opposite end of sleeve 21, the eye 24 being secured by solder 25 to the end of sleeve 21.

The operation of tool 20 is similar of that of tool 10 except that sleeve 21 is not slideable upon wire 23.

I claim:

1. A tubeless tire repair tool, comprising, a U-shaped wire having a bight portion at one end joined by a pair of elongated leg members terminating at the other end, an elongated flat steel sleeve slideably receiving said wire and providing guide means therefore, at least a portion of said leg members and said bight portion, respectively, projecting from opposite ends of said sleeve, a handle carried by said sleeve for easily sliding it upon said wire and solder means securing the pair of legs members together at said other end.

2. The combination according to claim 1, wherein the leg members of said other end have eye portions, said members being soldered together in parallel relationship adjacent said eye portions and forming together with said bight portion at said one end an elongated eye portion for receiving a plug and serving as a probe for a puncture in said tire.

3. The combination according to claim 2 wherein said handle is secured to one end of said sleeve.

* * * * *